(No Model.)

J. C. McCASKILL.
FERTILIZER DISTRIBUTER.

No. 245,191. Patented Aug. 2, 1881.

WITNESSES:
W. W. Hollingsworth
John E. Kennon

INVENTOR:
Jno. C. McCaskill
BY
ATTORNEYS.

UNITED STATES PATENT OFFICE.

JOHN C. McCASKILL, OF SHOE HEEL, NORTH CAROLINA.

FERTILIZER-DISTRIBUTER.

SPECIFICATION forming part of Letters Patent No. 245,191, dated August 2, 1881.

Application filed June 23, 1881. (No model.)

*To all whom it may concern:*

Be it known that I, JOHN C. McCASKILL, of Shoe Heel, in the county of Robeson and State of North Carolina, have invented a new and useful Improvement in Fertilizer-Distributers; and I do hereby declare that the following is a full, clear, and exact description of the same, reference being had to the accompanying drawings, forming part of this specification, in which—

Figure 1:
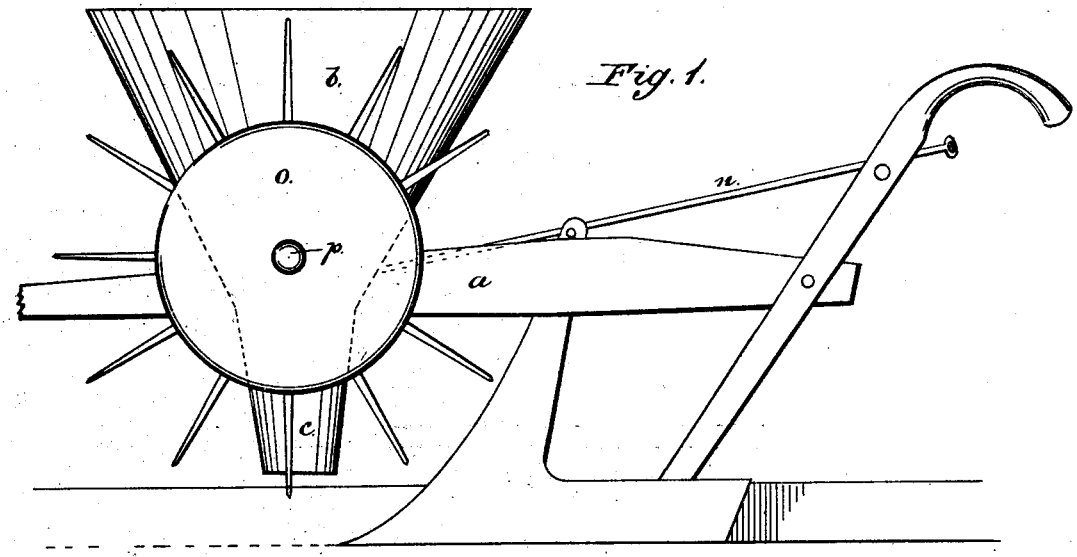
Figure 2:
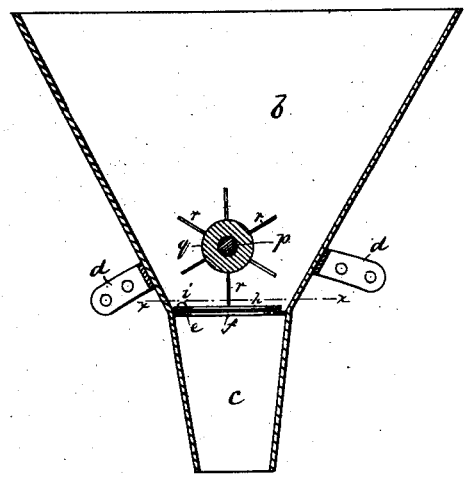
Figure 3:
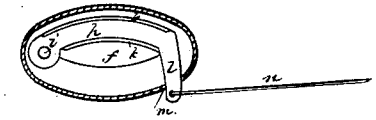

Figure 1 is a side elevation of my improved fertilizer-distributer. Fig. 2 is a vertical central section through the hopper and spout. Fig. 3 is a horizontal section in line $x\ x$, Fig. 2.

My invention relates to improvements in that class of fertilizer-distributers in which the feed-hopper carrying the fertilizer and provided with a cut-off is secured to a plow-beam; and it consists, first, of a reciprocating cut-off having both its edges sharpened, whereby less power is required to operate the cut-off, and the lumps are divided by the cut-off.

My invention further consists in the peculiar construction and arrangement of the parts, as hereinafter more fully set forth.

In the accompanying drawings, *a* represents the beam of an ordinary plow, to which is secured on one side by the band *d* the hopper *b*, provided with a spout, *c*, extending down nearly to the ground.

*e* represents a diaphragm or partition, extending horizontally across the hopper at its lower end, at its junction with the spout.

The diaphragm *e* is provided with a central opening, *f*, for the escape of the fertilizer introduced into the hopper, which fertilizer passes through the opening and spout to the ground in the line of the plow, in rear of the hopper.

*h* represents a curved cut-off, pivotally secured to the upper face of the diaphragm *e* at *i*.

The cut-off *h* is formed of a curved plate of metal having a double edge, or both its edges *k k* sharpened. The cut-off *h* is also provided with a bent end or offset, *l*, projecting through a slot, *m*, in the side of the hopper, and provided with a hole, through which is inserted a wire or rod, *n*, extending thence to the plow-handles, so that the plowman may operate the cut-off as desired.

By constructing the curved reciprocating cut-off with a double edge, or sharpened on each side, the plowman can operate the cut-off with less power and more ease, the sharpened edges readily passing through the fertilizer and dividing any lumps it may be brought in contact with, and comminuting or pulverizing the fertilizer in its reciprocations.

*o* represents a wheel, provided with radial spikes on its periphery, adapted in the forward movement of the plow to successively strike the ground and revolve said wheel.

*p* represents the spiked-wheel axle, fast to the wheel and journaled in the upper face of the plow-beam. The axle *p* passes through the hopper *b*, and is secured thereto by a nut.

*q* represents a hub secured to the axle *p*, and provided with arms *r*, adapted to revolve in the lower end of the hopper, over its opening in the forward movement of the plow, and agitate or stir the fertilizer.

I am aware that a hopper carrying a fertilizer and provided with a pivoted cut-off operated by a lever has heretofore been secured to a plow-beam, to which beam is attached a bearing for the shaft of a spiked wheel, which shaft passes through the hopper and carries a stirrer revolving in the hopper, and I therefore lay no claim, broadly, to such invention.

What I claim as my invention is—

1. The combination, with the hopper *b*, provided with the diaphragm *e*, having a central opening, *f*, of the curved double-edged cut-off *h*, pivoted to said diaphragm, substantially as described, and for the purpose set forth.

2. The combination, with the hopper *b*, secured to the beam *a* and provided with the spout *c* and diaphragm *e*, having a central opening, *f*, of the curved double-edged cut-off *h*, pivoted to the diaphragm and provided with an offset, *l*, wire or rod *n*, and axle *p*, journaled in or clamped to the plow-beam and carrying a spiked wheel and stirrer, substantially as described, and for the purpose set forth.

JOHN C. McCASKILL.

Witnesses:
A. McL. MORRISON,
J. A. PATTERSON.